US011351703B2

(12) United States Patent
LeBlanc et al.

(10) Patent No.: US 11,351,703 B2
(45) Date of Patent: Jun. 7, 2022

(54) MATCHED COMPRESSION DIE APPARATUS

(71) Applicant: The Boeing Company, Chicago, IL (US)

(72) Inventors: Russ Raynal LeBlanc, Kirkland, WA (US); Andrew Anthony Pillar, Camano Island, WA (US); Chris Gren McInelly, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 15/992,465

(22) Filed: May 30, 2018

(65) Prior Publication Data

US 2019/0366599 A1    Dec. 5, 2019

(51) Int. Cl.
*B29C 43/36* (2006.01)
*B33Y 80/00* (2015.01)
*B29C 33/38* (2006.01)
*B29C 43/52* (2006.01)
*B29L 31/30* (2006.01)

(52) U.S. Cl.
CPC .......... *B29C 43/36* (2013.01); *B29C 33/3842* (2013.01); *B29C 43/52* (2013.01); *B33Y 80/00* (2014.12); *B29C 2043/3665* (2013.01); *B29L 2031/3076* (2013.01)

(58) Field of Classification Search
CPC . B29C 70/345; B29C 70/346; B29C 33/3842; B33Y 80/00
See application file for complete search history.

(56) References Cited

U.S. PATENT DOCUMENTS

| 4,250,397 | A | * | 2/1981 | Gray | H05B 3/36 |
| | | | | | 219/212 |
| 4,560,428 | A | * | 12/1985 | Sherrick | B29C 66/7212 |
| | | | | | 156/94 |
| 5,591,291 | A | * | 1/1997 | Blackmore | E04G 23/0225 |
| | | | | | 156/173 |
| 6,749,794 | B2 | * | 6/2004 | Spengler | B29C 51/423 |
| | | | | | 264/458 |
| 9,902,108 | B1 | * | 2/2018 | Wurmfeld | B23P 15/007 |
| 2003/0030188 | A1 | * | 2/2003 | Spengler | B29C 43/36 |
| | | | | | 264/458 |
| 2003/0234471 | A1 | * | 12/2003 | Kuroiwa | B30B 15/041 |
| | | | | | 264/320 |
| 2004/0217518 | A1 | * | 11/2004 | Newman | B21D 37/12 |
| | | | | | 264/319 |

(Continued)

*Primary Examiner* — Nahida Sultana
*Assistant Examiner* — Debjani Roy
(74) *Attorney, Agent, or Firm* — Kolisch Hartwell, P.C.

(57) ABSTRACT

A matched compression die apparatus comprising an additively manufactured core member and an additively manufactured cavity member may be used to manufacture compression-molded parts, such as thermoset and/or thermoplastic panels for aircraft interiors. The apparatus may include generic frame structures configured to support different additively manufactured core and cavity members configured for molding different panels. The additively manufactured core and cavity members may be made of metal and/or a polymer material. The apparatus may include a heating mechanism (e.g., heat blankets) configured to heat the core and cavity members sufficiently to mold a workpiece into a desired shape.

19 Claims, 10 Drawing Sheets

(56) References Cited

U.S. PATENT DOCUMENTS

| | | | |
|---|---|---|---|
| 2005/0184432 A1* | 8/2005 | Mead | B29C 33/307 |
| | | | 264/272.15 |
| 2011/0193253 A1* | 8/2011 | Polk | B29C 48/08 |
| | | | 264/40.7 |
| 2015/0017390 A1* | 1/2015 | Mine | B29C 43/203 |
| | | | 428/156 |
| 2015/0344138 A1* | 12/2015 | Wen | H05B 3/286 |
| | | | 219/541 |
| 2016/0107354 A1* | 4/2016 | Holderman | B29C 45/2675 |
| | | | 264/328.1 |
| 2016/0375609 A1* | 12/2016 | Sander | B33Y 80/00 |
| | | | 264/219 |
| 2019/0213990 A1* | 7/2019 | Jonza | G10K 11/172 |

* cited by examiner

MATCHED COMPRESSION DIE APPARATUS

FIELD

This disclosure relates to systems and methods for manufacturing tools for compression molding.

INTRODUCTION

Compression molding systems are used to manufacture parts in a variety of industries. In aerospace applications, for example, compression molding systems are widely used to manufacture aircraft interior panels made of thermoset materials. However, the compression molding apparatus components currently used to manufacture the panels are typically very large and heavy, and manufacturing processes involving these components may therefore be inflexible, expensive, and inconvenient. For example, moving the compression die components from place to place and compressing them in a press is typically difficult. Additionally, the time and expense necessary to manufacture a conventional compression die apparatus are burdensome. A compression die apparatus that is lighter and requires less time and expense to manufacture would be a significant advantage for the manufacture of aircraft interior panels and other objects.

SUMMARY

The present disclosure provides systems, apparatuses, and methods relating to compression die components. In some embodiments, a matched compression die apparatus comprises an additively manufactured first die component having a first middle section configured to mold a contour on a first side of a workpiece, an additively manufactured second die component having a second middle section configured to mold a contour on a second side of the workpiece, a heating mechanism configured to heat the first and second middle sections sufficiently to mold the workpiece into a desired shape, and a compression device configured to press the first and second middle sections toward each other.

In some embodiments, a matched compression die apparatus comprises a core member and a cavity member configured to cooperatively shape opposing sides of a panel, a first frame structure configured to support the core member, a second frame structure configured to support the cavity member, wherein the frame structures are generic, the core and cavity members being selectively mounted in the corresponding frame structures and configured for molding a specific panel shape.

In some embodiments, a method of manufacturing a matched compression mold die comprises additively manufacturing a core member, additively manufacturing a cavity member, connecting a first heating element to the core member, connecting a second heating element to the cavity member, and mounting the core and cavity members in a frame structure configured for molding a workpiece.

Features, functions, and advantages may be achieved independently in various embodiments of the present disclosure, or may be combined in yet other embodiments, further details of which can be seen with reference to the following description and related drawings.

DETAILED DESCRIPTION

Figure 1:
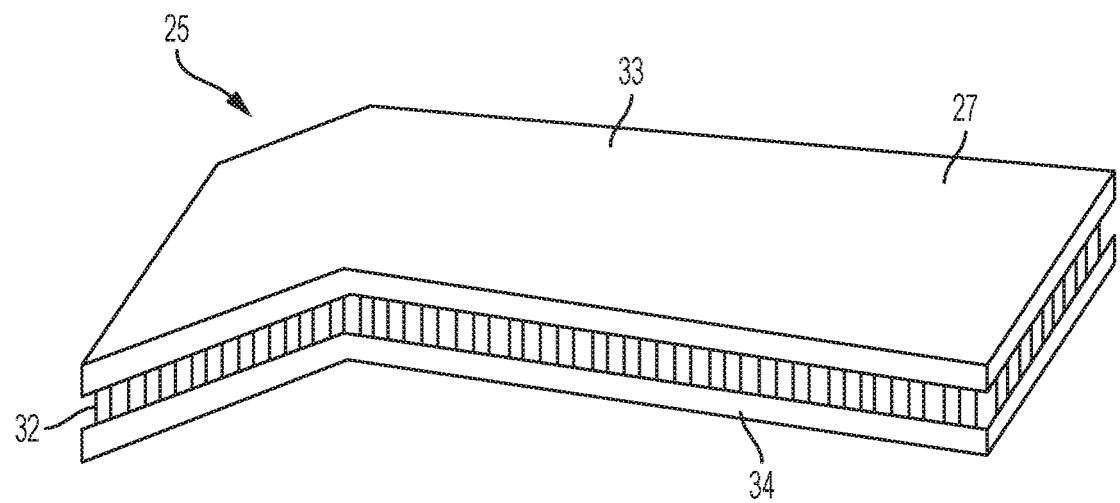
FIG. 1 is an isometric view of an illustrative aircraft interior sandwich panel in accordance with aspects of the present disclosure.

Various aspects and examples of a matched compression die apparatus having additively manufactured components, as well as related methods, are described below and illustrated in the associated drawings. Unless otherwise specified, a matched compression die apparatus in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

In general, a matched compression die apparatus in accordance with the present teachings includes first and second compression die components. A workpiece (also referred to as a charge) is disposed between respective middle sections of the first and second die components. The middle sections are configured to mold the workpiece into a desired shape. The matched compression die apparatus further includes a compression device configured to press the middle sections toward each other. A heating mechanism of the compression die apparatus heats the middle sections to facilitate the molding and/or curing of the workpiece.

One or more components of the matched compression die apparatus may be additively manufactured. Additive manufacturing typically includes applying a raw material (e.g., a metal, a thermoplastic, etc.) in ordered layers according to digital design information, and selectively joining and/or fusing the applied layers to create a desired object. Additive manufacturing techniques may include 3D printing, rapid prototyping, direct digital manufacturing, layered manufacturing, additive fabrication, and the like. One or both compression die components of the present disclosure may be produced by additive manufacturing. In some examples, only the middle sections of the compression die components are produced by additive manufacturing, and other parts of the compression die components and apparatus are manufactured by traditional means such as machining.

In some examples, additively manufactured middle sections of the compression die components are interchangeable. For example, a plurality of middle sections each configured to mold a workpiece into a different shape may be additively manufactured and selectively mounted in generic frame structures.

The matched compression die apparatus described herein is typically used to manufacture an interior panel for an aircraft. For example, if the apparatus is to be used to turn the workpiece into a contoured panel, then the middle sections of the compression die components may each be configured to mold a contour on a side of the workpiece.

Examples, Components, and Alternatives

The following sections describe selected aspects of an exemplary compression die apparatus, as well as related systems and methods. The examples in these sections are intended for illustration and should not be interpreted as limiting the entire scope of the present disclosure. Each section may include one or more distinct embodiments or examples, and/or contextual or related information, function, and/or structure.

A. Illustrative Sandwich Panel

Figure 2:
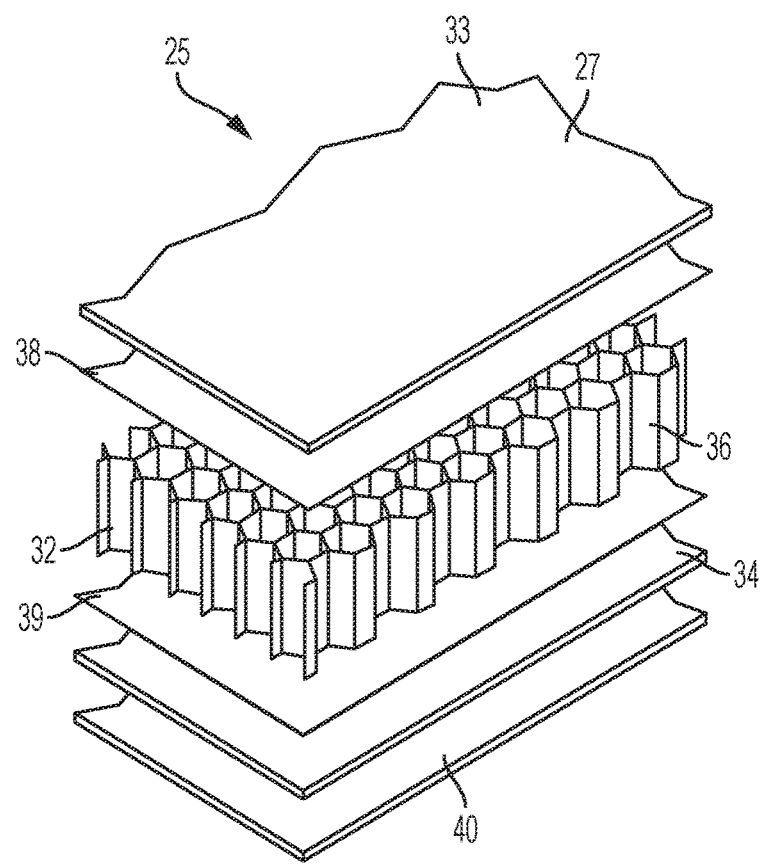
FIG. 2 is a fragmentary exploded view of the sandwich panel of FIG. 1.
Figure 3:
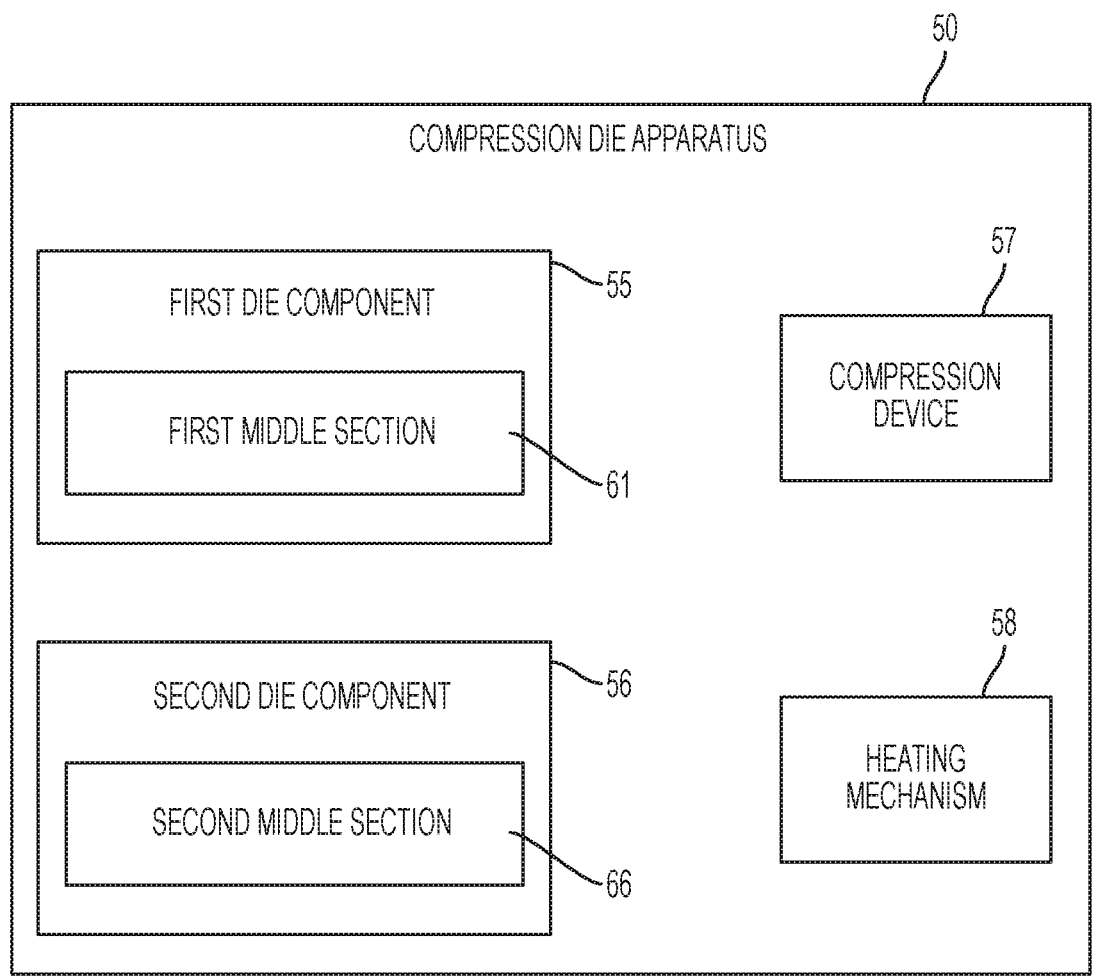
FIG. 3 is a schematic diagram of an illustrative compression die apparatus in accordance with aspects of the present disclosure.

As shown in FIGS. 1-2, this section describes an illustrative sandwich panel 25. Sandwich panel 25 is an example of an aircraft interior panel that may be manufactured using a compression die apparatus, as described above.

FIG. 1 is an isometric view of sandwich panel 25. One or more sandwich panels 25 may be used to form an interior portion of an aircraft, such as a floor, ceiling, and/or wall. Sandwich panel 25 is a sandwich composite panel comprising a plurality of layers and typically has a contoured shape. First side 27 and second side (not shown) of sandwich panel 25 may have the same contour, as shown in FIG. 1, or may have different contours.

FIG. 2 depicts illustrative layers of sandwich panel 25. Sandwich panel 25 includes a honeycomb core 32 disposed between first and second facing layers 33 and 34. Facing layers 33 and 34 may each include a thermoset polymer matrix, such as an epoxy resin and/or a phenolic resin, and may also incorporate a reinforcing system such as carbon fiber, aramid, fiberglass, woven fiberglass cloth, and/or the like. Additionally, or alternatively, facing layers 33 and 34 may include thermoplastic materials and/or other polymers.

Honeycomb core 32 comprises a plurality of hollow columns 36 arranged in a honeycomb pattern, each column having a substantially hexagonal cross-section and extending between facing layers 33 and 34. Adhesive film layers 38 and 39 may be included to bond respective sides of honeycomb core 32 to facing layers 33 and 34. In some examples, panel 25 also includes one or more fire-retardant coatings 40. Coatings 40 may additionally, or alternatively, include decorative material such as paint.

Sandwich panel 25 is an example of an object that may be manufactured using a compression die apparatus, as described above. For example, sandwich panel 25 may be manufactured using the compression die apparatus in a crushed-core molding process. A compression die apparatus may additionally, or alternatively, be used to manufacture other types of panel and/or other types of objects.

B. Illustrative Matched Compression Die Apparatus

As shown in FIGS. 3-13, this section describes an illustrative matched compression die apparatus 50. Matched compression die apparatus 50 is an example of a matched compression die apparatus as described above. As shown schematically in FIG. 3, matched compression die apparatus 50 includes first additively manufactured die component 55, second additively manufactured die component 56, compression device 57, and heating mechanism 58.

Figure 4:
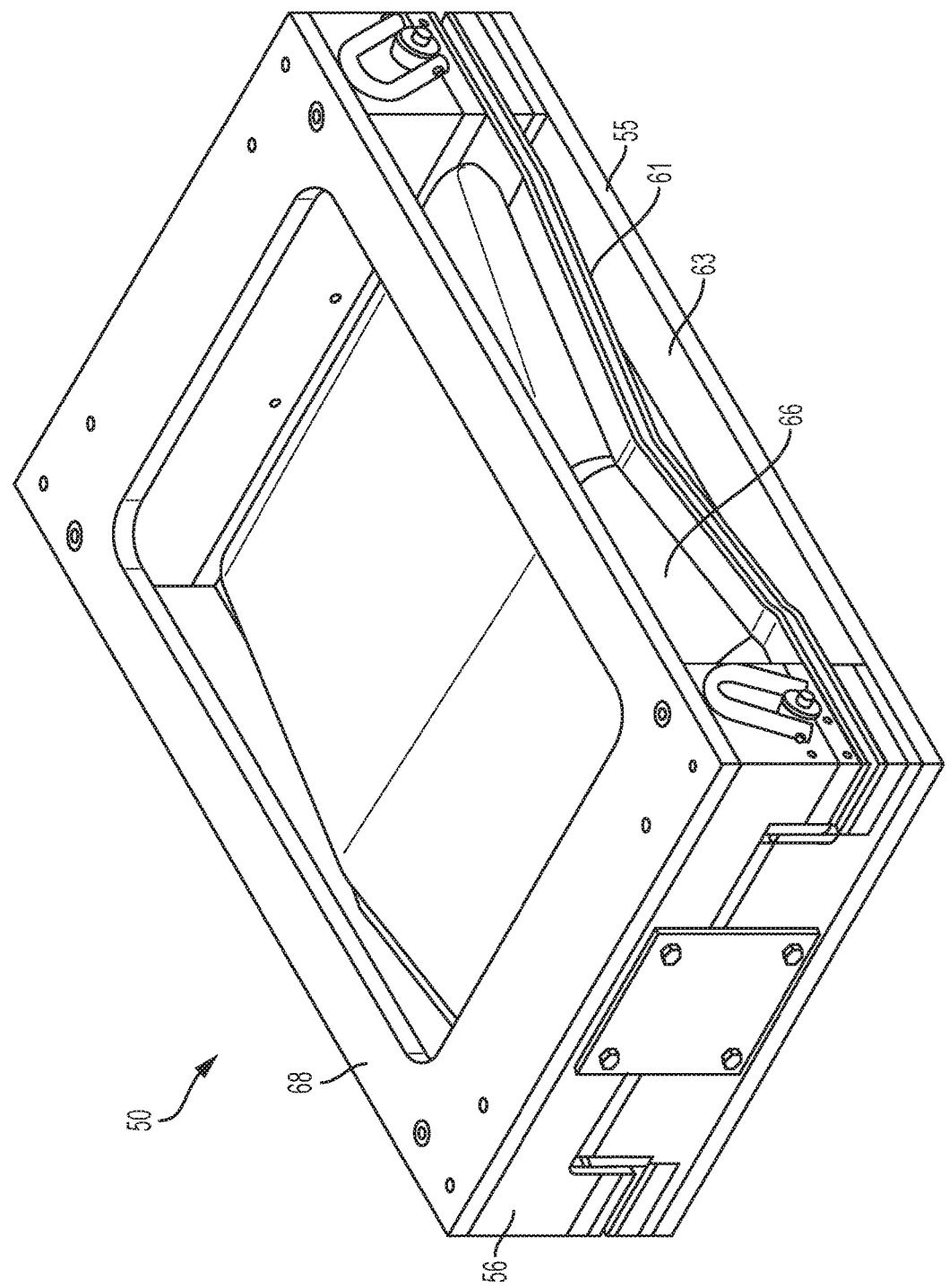
FIG. 4 is an isometric view of an illustrative compression die apparatus in accordance with aspects of the present disclosure.

FIG. 4 depicts matched compression die apparatus 50 comprising a first additively manufactured die component 55 and a second additively manufactured die component 56. First additively manufactured die component 55 includes a first middle section 61 supported by a first frame structure 63. Second additively manufactured die component 56 includes a second middle section 66 supported by a second frame structure 68. In typical use, first additively manufactured die component 55 is disposed above second additively manufactured die component 56, with first and second middle sections 61 and 66 facing each other.

Figure 5:
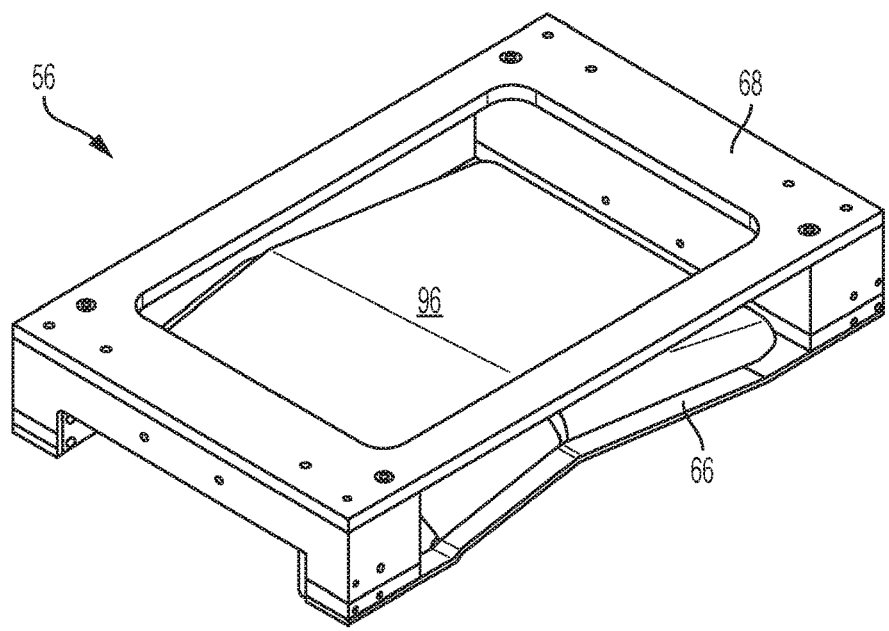
FIG. 5 is a partially exploded view of the compression die apparatus of FIG. 4.
Figure 5:
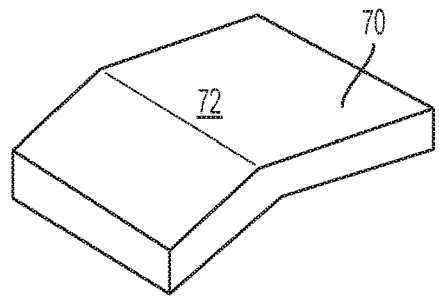
Figure 5:
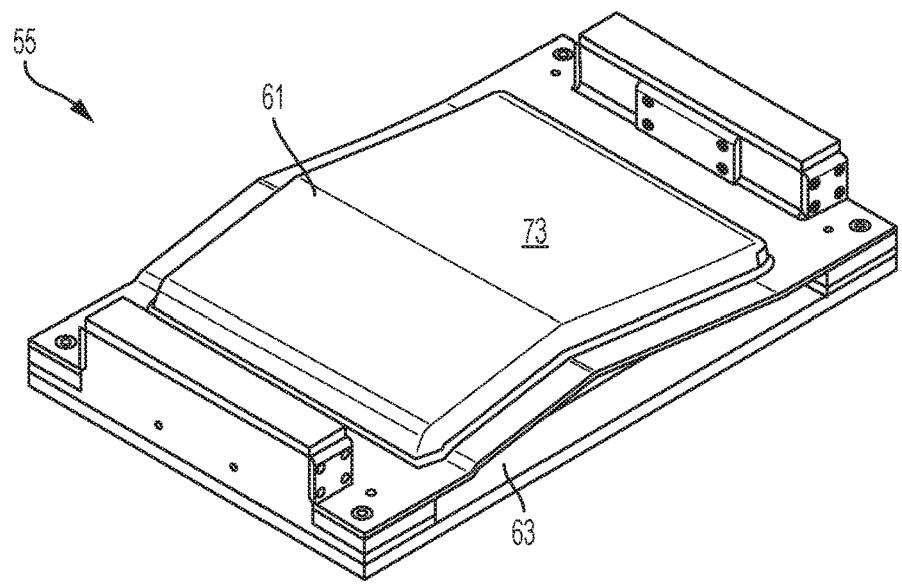

First and second middle sections 61 and 66 are configured to cooperatively shape opposing sides of a workpiece 70 (see FIG. 5) disposed between the first and second middle sections. For example, first middle section 61 may be configured to mold a contour on a first side (not shown) of workpiece 70, and second middle section 66 may be configured to mold a contour on a second side 72 of workpiece 70. FIG. 5 is a partially exploded view of compression die apparatus 50 illustrating the position of workpiece 70 between first and second middle sections 61 and 66.

Typically, compression die apparatus 50 is configured to manufacture an interior panel for an aircraft, such as a solid thermoset phenolic wall panel, a sandwich thermoset phenolic wall panel, and/or the like. Accordingly, in some examples, first and second middle sections 61 and 66 respectively include substantially flat and/or contoured first and second forming surfaces 73 and 76 (see FIG. 11) configured to mold workpiece 70 into a panel. In some examples, first forming surface 73 of first middle section 61 is contoured in a convex shape and second forming surface 76 of second middle section 66 is contoured in a concave shape. In these examples, first middle section 61 may be called a core member, and second middle section 66 may be called a cavity member. In the figures of the present disclosure, the bottom die component is depicted as including the core member, and the top die component is depicted as including the cavity member. However, in some examples, the bottom die component includes the cavity member and the top die component includes the core member.

In some examples, first and second middle sections 61 and 66 have similar curvatures, geometric features, and/or material constituents. These examples may be suitable for creating an aircraft panel with substantially uniform thickness having matching offset curvature on both sides.

In some examples, first and second middle sections 61 and 66 are configured to be interchangeable, and first and second frame structures 63 and 68 are generic and/or fixed structures configured to selectively support any one of a plurality of different interchangeable middle sections. A plurality of different interchangeable first middle sections 61 and/or a plurality of different interchangeable second middle sections 66 may be provided for molding workpieces 70 of different shapes. For example, an aircraft panel having a specific shape may be manufactured using a selected first middle section 61 and selected second middle section 66 configured for molding the specific panel shape.

Figure 7:
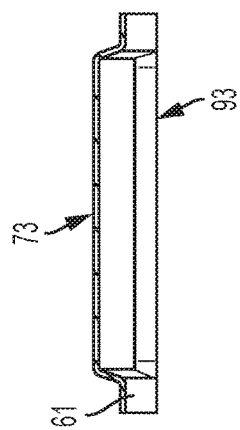
FIG. 7 is a top view of the die component middle section of FIG. 6.
Figure 6:
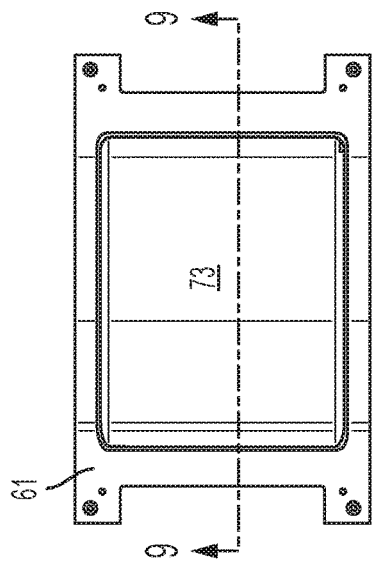
FIG. 6 is an isometric view of an illustrative middle section of a compression die component of the compression die apparatus of FIG. 4.
Figure 8:
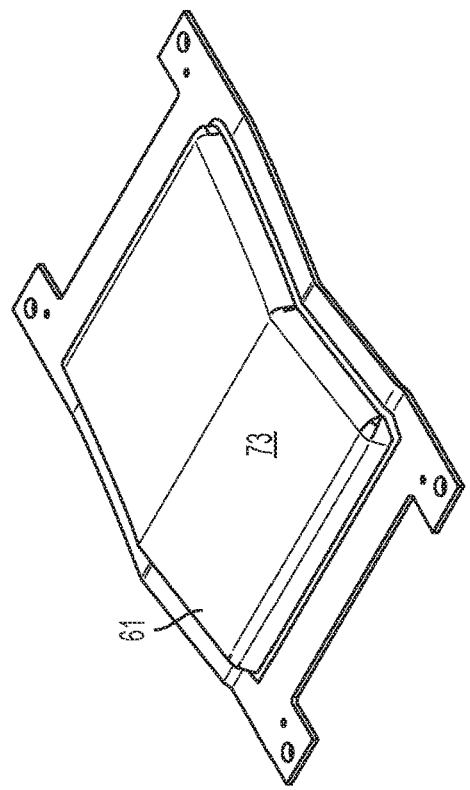
FIG. 8 is a front view of the die component middle section of FIG. 6.
Figure 9:
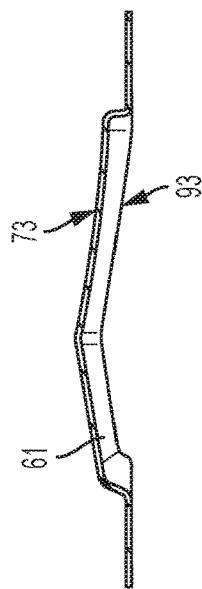
FIG. 9 is a section view of the die component middle section of FIG. 6 taken along the direction indicated in FIG. 7.
Figure 10:
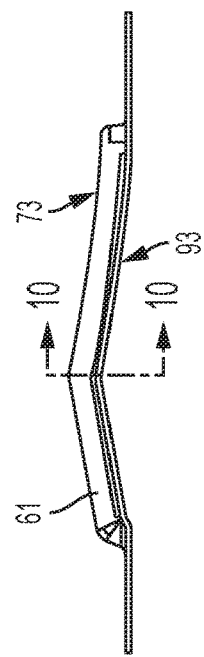
FIG. 10 is a section view of the die component middle section of FIG. 6 taken along the direction indicated in FIG. 8.

FIGS. 6-10 depict an illustrative first middle section 61. FIG. 6 is an isometric view of middle section 61, depicting a convex forming surface 73. FIGS. 7 and 8 are a top view and a front view of middle section 61, respectively. FIG. 9 is a section view along the direction indicated in FIG. 7, and FIG. 10 is a section view along the direction indicated in FIG. 8.

Figure 11:
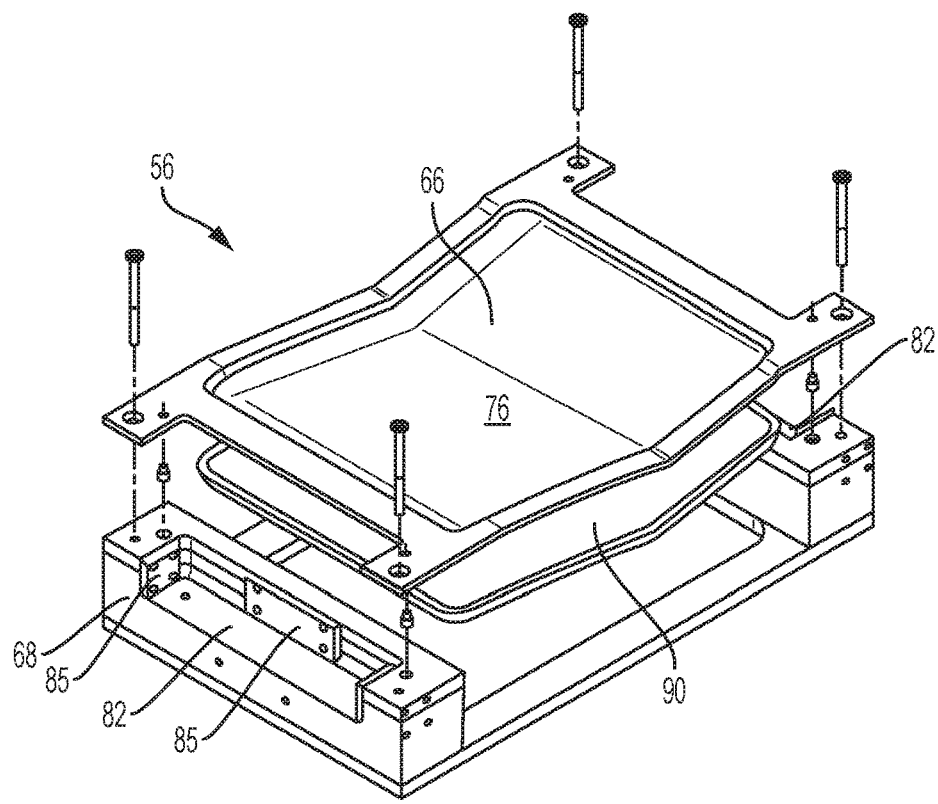
FIG. 11 is an isometric view of an illustrative compression die component of the compression die apparatus of FIG. 4.
Figure 12:
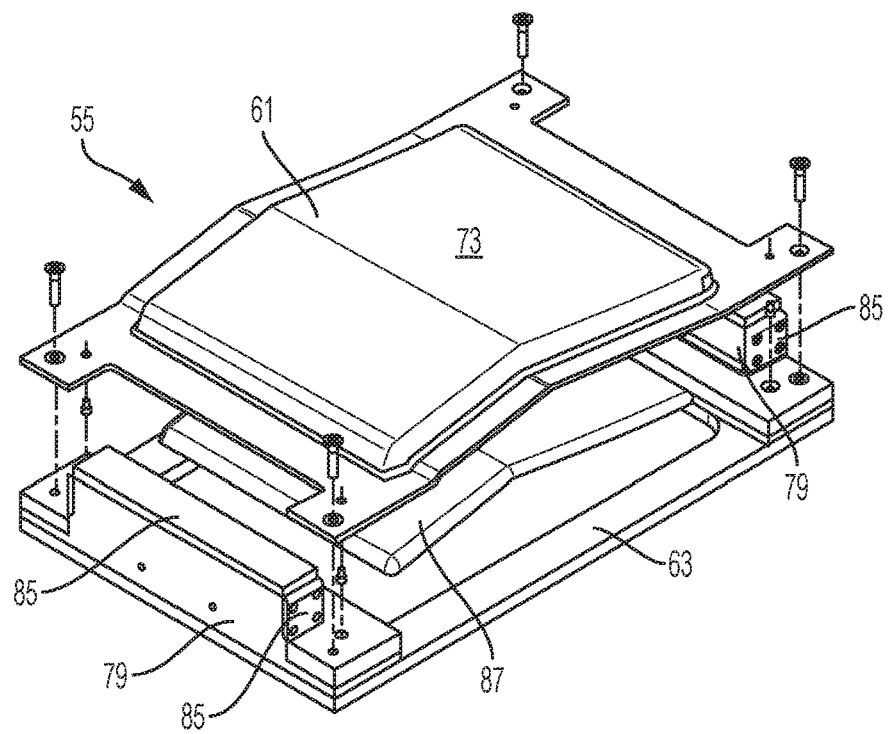
FIG. 12 is an isometric view of another illustrative compression die component of the compression die apparatus of FIG. 4.

FIGS. 11 and 12 are exploded views depicting first and second additively manufactured die components 55 and 56, including first and second middle sections 61 and 66 mounted respectively to first and second frame structures 63 and 68. In the examples depicted in FIGS. 11 and 12, first and second middle sections 61 and 66 are attached respectively to first and second frame structures 63 and 68 using an assembly of bolts and pins. Additionally, or alternatively, first and second middle sections 61 and 66 may be attached to first and second frame structures 63 and 68 using latches, clips, clamps, screws, nails, and/or any other suitable fastener. In some examples, first and second frame structures 63 and 68 include grooves, slots, and/or other suitable openings configured to receive portions of first and second middle sections 61 and 66, and the middle sections are mounted within respective frame structures by positioning the middle sections such that those portions are received within the corresponding openings.

As described above, first and second middle sections 61 and 66 may be configured to be interchangeable, and first and second frame structures 63 and 68 may be fixed. Accordingly, the mechanism for mounting first and second middle sections 61 and 66 to first and second frame structures 63 and 68 may be configured such that the middle sections can be easily mounted to and removed from the respective frame structures without damage to the middle sections or frame structures. The bolt and pin assemblies depicted in FIGS. 11-12 are examples of mounting mechanisms enabling mounting and removal of interchangeable first and second middle sections 61 and 66 to first and second frame structures 63 and 68.

As described above, first and second middle sections 61 and 66 are typically manufactured at least partially by additive manufacturing. For example, first and second middle sections 61 and 66 may be additively manufactured, e.g., from metal and/or from thermoplastic material. The relatively small cost and manufacturing time required to additively manufacture first and second middle sections 61 and 66 may facilitate the production of different first and second middle sections configured for manufacturing, e.g., different aircraft panel configurations. First and second frame structures 63 and 68 may be entirely or partially additively manufactured and/or may be manufactured by other means (e.g., machining). First and second frame structures 63 and 68 are typically rigid structures.

First and second frame structures 63 and 68 may include alignment features configured to facilitate proper alignment of the frame structures when they are pressed together to mold workpiece 70. As depicted in FIGS. 11-12, first frame structure 63 may include one or more alignment projections 79 projecting from the first frame structure, and second frame structure 68 may include corresponding alignment pockets 82 configured to receive the alignment projections. Optionally, one or more alignment blocks 85 (e.g., heel blocks and/or spacer blocks) may be disposed on alignment projections 79 and/or within alignment pockets 82 to adjust the alignment and/or vertical spacing between first and second frame structures 63 and 68.

As shown in FIGS. 11-12, a first heating blanket 87 is attached to first middle section 61 and a second heating blanket 90 is attached to second middle section 66. First and second heating blankets 87 and 90 are examples of heating mechanism 58 for matched compression die apparatus 50, described above. Typically, first heating blanket 87 is connected to a first non-forming surface 93 (see FIGS. 8-10) opposite first forming surface 73 of first middle section 61, and second heating blanket 90 is connected to a second non-forming surface 96 (see FIG. 5) opposite second forming surface 76 of second middle section 66. First and second heating blankets 87 and 90 are configured to provide heat to first and second die components 55 and 56, which may facilitate molding of workpiece 70 (e.g., molding of thermoplastic materials and/or other polymer materials in the workpiece.) Heat provided by first and second heating blankets 87 and 90 may additionally or alternatively facilitate curing of any thermosetting material within the workpiece. Electrical connections, processing logic, thermocouples and/or other suitable temperature sensors, cooling mechanisms, and any other suitable equipment for controlling the heat provided by first and second heat blankets 87 and 90 may be provided as needed.

In some examples, first and second heat blankets 87 and 90 comprise "smart susceptors" configured to maintain a temperature within a predetermined range using automatic changes in the amount of heat produced by inductive heating based on the difference between the actual temperature and the Curie temperature of the susceptor. Additionally, or alternatively, first and second heat blankets 87 and 90 may be configured to produce heat by resistive heating. In some examples, first and second heat blankets 87 and 90 comprise carbon nanotube films configured to produce heat by, e.g., resistive heating.

In some examples, first and second heat blankets 87 and 90 comprise multiple heat blankets disposed adjacent each other on first and second non-forming surfaces 93 and 96 respectively. In these examples, first and second heat blankets 87 and 90 may be referred to as multi-zonal heat blankets and/or a multi-zonal heat blanket system. Each constituent heat blanket, or subsets of constituent heat blankets, may include respective power supplies and processing logic configured to control heat production. Using multiple heat blankets may improve heat uniformity and/or the ease with which heat blankets may be installed and/or replaced.

First and second heat blankets 87 and 90 may be bonded to first and second middle sections 61 and 66 (e.g., to first and second non-forming surfaces 93 and 96) by an adhesive. The adhesive may comprise a resin such as a phenolic resin, an epoxide resin, and/or the like. In some examples, material with high thermal conductivity is incorporated into the adhesive resin to increase the efficiency of heat transfer from first and second heat blankets 87 and 90 to first and second middle sections 61 and 66.

As depicted in FIGS. 4-5 and 11-12, first and second frame structures 63 and 68 may be substantially open adjacent first and second non-forming surfaces 93 and 96 to facilitate access to first and second heat blankets 87 and 90, e.g., for installation and/or maintenance of the heat blankets. Removable lids may be provided to cover the openings on first and second frame structures 63 and 68 when access to first and second heat blankets 87 and 90 is not desired; the lids may prevent damage and/or heat loss.

In some examples, first and second heat blankets 87 and 90 are omitted, and compression die apparatus 50 is disposed inside an oven. In some examples, the oven may be configured to heat compression die apparatus 50 by alternative heating sources.

First and second heat blankets 87 and 90, and/or any other heating mechanism 58, may be configured to heat workpiece 70 to a temperature between 150 and 350 degrees Fahrenheit, and/or a temperature between 200 and 300 degrees Fahrenheit. In some examples, heating mechanism 58 is configured to heat first and second die components 55 and 56 such that the temperature across each of first and second forming surfaces 73 and 76 is uniform within a predetermined range (e.g., uniform within a tolerance of ±16 degrees Fahrenheit, and/or ±12 degrees Fahrenheit, and/or ±8 degrees Fahrenheit, and/or ±4 degrees Fahrenheit, and/or any other suitable tolerance). If first and second die components 55 and 56 are made of a thermoplastic material, then the temperature to which the die components are heated (e.g., the temperature suitable for thermosetting workpiece 70) is lower than the thermoplastic transition temperature. The thermoplastic material remains solid up to a temperature higher than the temperature of workpiece 70.

Figure 13:
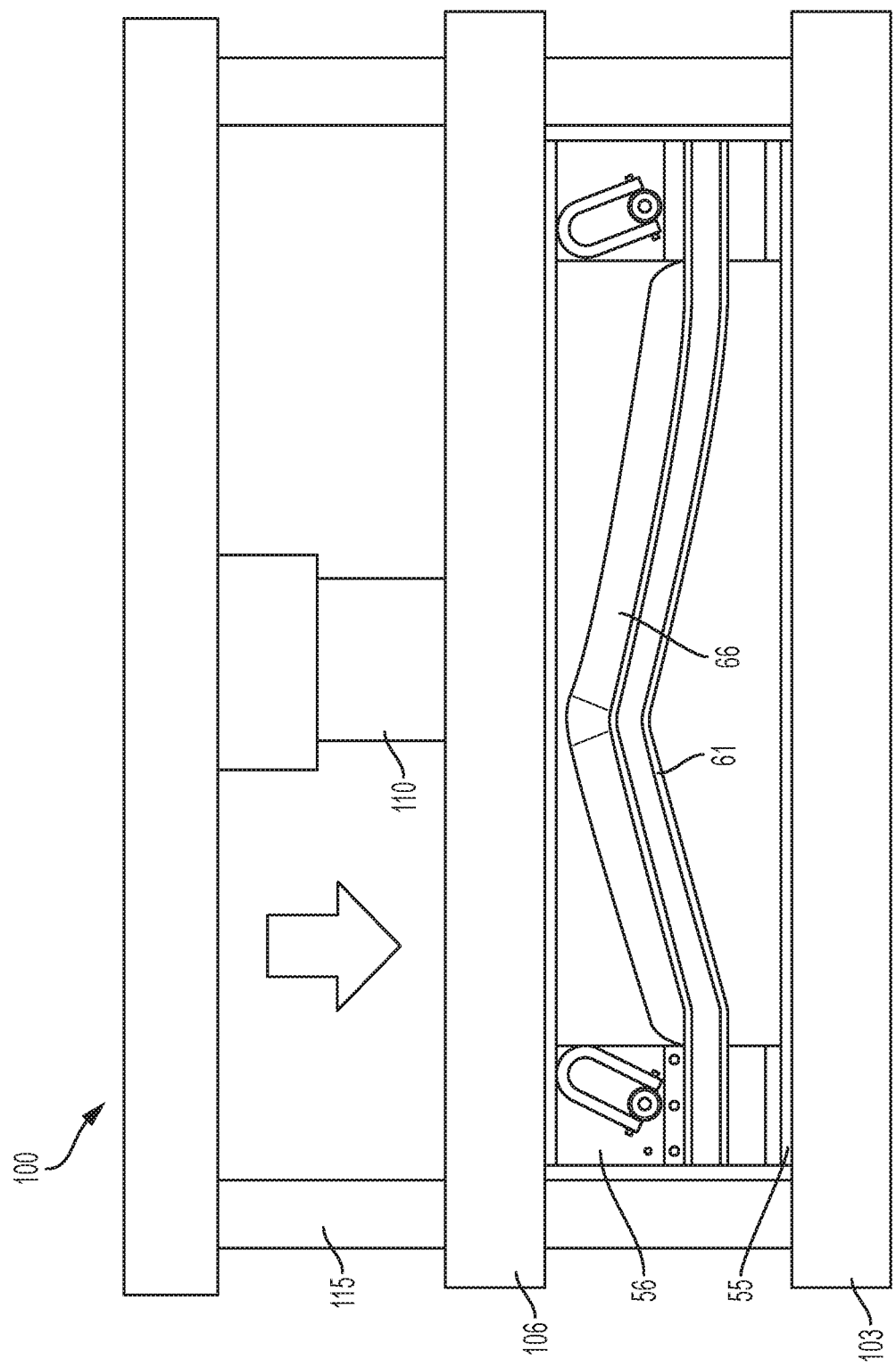
FIG. 13 is a schematic diagram depicting a press for use in conjunction with the compression die apparatus of FIG. 4.

FIG. 13 depicts an illustrative press 100 configured to apply a force directing first and second middle sections 61 and 66 (e.g., a core member and a cavity member) toward each other. Press 100 is an example of compression device 57, described above. Press 100 comprises first and second platens 103 and 106 and an actuator 110 configured to force the platens toward each other. Actuator 110 may comprise one or more hydraulic cylinders, pneumatic cylinders, and/or the like. First and second die components 55 and 56 are positioned between first and second platens 103 and 106 such that pressing the platens toward each other also presses first and second middle sections 61 and 66 toward each other. For example, first platen 103 may engage a bottom side of first die component 55, and second platen 106 may engage a top side of second die component 56. In illustrative press 100, first platen 103 is fixed in place and second platen 106 is slidably mounted on a frame 115. Actuator 110, which is at least partially supported by frame 115, is configured to push second platen 106 toward first platen 103. Actuator 110 may also be configured to lift second platen 106 away from first platen 103. In some examples, second platen 106 is instead fixed in place and first platen 103 is movable; in other examples, both platens are movable.

Press 100 may be configured to apply a pressure of at least 50 pounds per square inch (PSI) forcing first and second middle sections 61 and 66 toward each other. In some examples, press 100 may be configured to apply a pressure of 50 to 250 PSI forcing first and second middle sections 61 and 66 toward each other.

As described above, at least some components of matched compression die apparatus 50 are additively manufactured. In some examples, first and second die components 55 and 56 are entirely additively manufactured; in some examples, first and second middle sections 61 and 66 are additively manufactured and first and second frame structures 63 and 68 are manufactured by other methods. Because matched compression die apparatus 50 is at least partially additively manufactured, it may have a relatively small weight compared to a compression die apparatus manufactured by traditional methods. For example, the additively manufactured portions of matched compression die apparatus 50 may be made of a lightweight material such as a thermoplastic. Additionally, or alternatively, the additive manufacturing process may allow portions of matched compression die apparatus 50 to be manufactured using less material than would be feasible by conventional manufacture methods; accordingly, matched compression die apparatus 50 may be lighter in weight than an apparatus manufactured entirely by traditional methods even if the additively manufactured portions of matched compression die apparatus 50 are made of a conventional material such as steel. In some examples, matched compression die apparatus 50 weighs less than 1000 pounds. In some examples, matched compression die apparatus 50 weighs less than 500 pounds. In contrast, known matched compression die apparatuses typically weigh over 10,000 pounds, and may weigh over 14,000 pounds, or over 20,000 pounds.

C. Illustrative Method of Additive Manufacture

Figure 14:
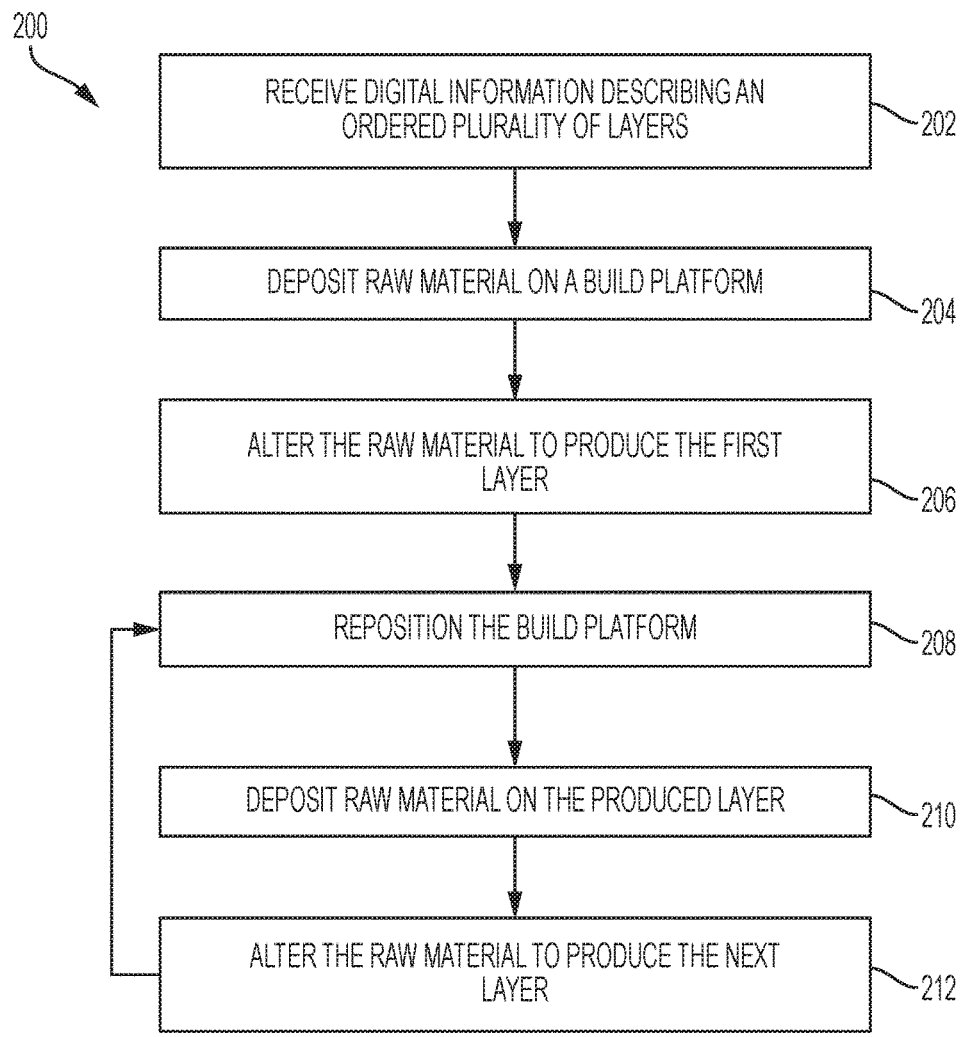
FIG. 14 is a flow diagram depicting steps in an illustrative method of additive manufacture.

This section describes steps of an illustrative method for additive manufacture of an additively manufactured workpiece (e.g., first and second die components 55 and 56 and/or first and second middle sections 61 and 66); see FIG. 14. Aspects of an illustrative additive manufacturing device depicted in FIG. 15 may be utilized in the method steps described below. Where appropriate, reference may be made to components and systems that may be used in carrying out each step. These references are for illustration, and are not intended to limit the possible ways of carrying out any particular step of the method.

Additive manufacturing is quickly gaining popularity in many industries as a method of rapid production at relatively low cost. Additive manufacturing may be used to create a solid object from a 3D model by building the object incrementally. Additive manufacturing techniques typically apply a raw material in layers and selectively join the raw material to create the desired object. The thickness of the individual layers may depend on the specific additive manufacturing techniques used. Illustrative techniques include selective laser melting (SLM), direct metal laser sintering (DMLS), selective laser sintering (SLS), fused filament fabrication (FFF), wire-feed additive manufacturing, and electron beam melting (EBM), among others. Wire-feed additive manufacturing techniques may include wire and laser additive manufacturing (WLAM), electron beam freeform fabrication (EBF3), wire and arc additive manufacturing (WAAM), and/or the like.

FIG. 14 is a flowchart illustrating steps performed in an illustrative method 200, and may not recite the complete process or all steps of the method. Although various steps of method 200 are described below and depicted in FIG. 14, the steps need not necessarily all be performed, and in some cases may be performed simultaneously or in a different order than the order shown.

Figure 15:
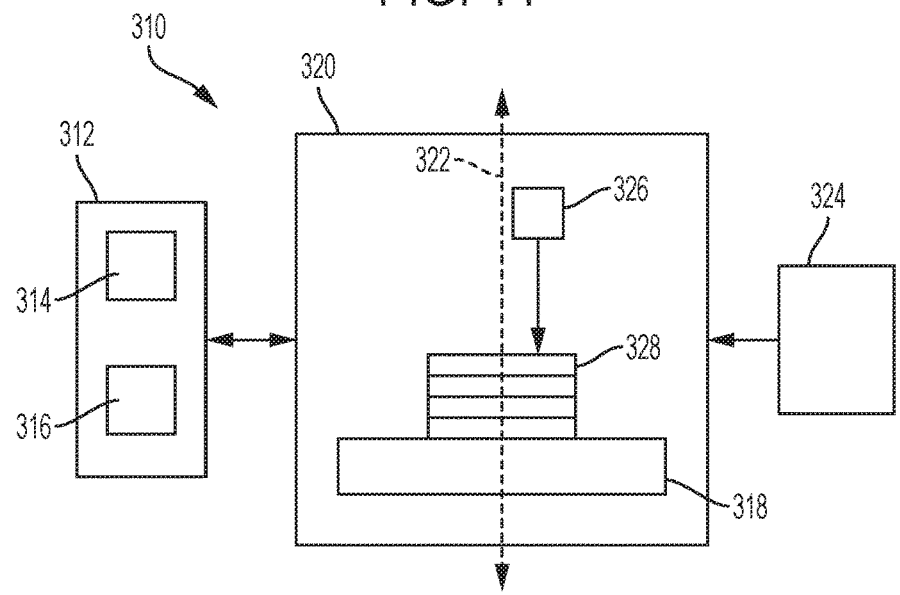
FIG. 15 is a schematic diagram depicting an illustrative additive manufacturing device suitable for carrying out the method of FIG. 14.

At step 202, digital information describing an ordered plurality of layers is received. The digital information may be received by a computer controller 312 of an additive manufacturing device 310 as depicted in FIG. 15. Additive manufacturing device 310 may also be referred to as a printer or a fabricator. Computer controller 312 may comprise any data processing system configured to receive digital design information and control functions of printer 310. The illustrative computer controller shown in FIG. 15 includes a processor 314 for controlling printer functions and memory 316 for storing received data.

The received information may include geometric data and/or design details for a plurality of two-dimensional patterns that constitute layers of a three-dimensional object, where the three-dimensional object is an additively manufactured workpiece 328 to be manufactured. The layers may also be described as cross-sections or slices. The plurality of layers is ordered, such that the layers may be numbered or organized from a first layer to a last layer.

Step 204 of method 200 includes depositing raw material on a build platform 318 located in a building environment 320 of printer 310. Build platform 318 may comprise a support moveable by computer controller 312 along a manufacturing axis 322. Build platform 318 may have a planar surface perpendicular to manufacturing axis 322.

The raw material may be any material appropriate to additive manufacturing, typically a fluid, powder, and/or wire, and including but not limited to photopolymer resin, thermoplastic, thermoset material, neat and/or reinforced polymer material, plaster, ceramic, and metal. The material may be distributed from a raw material source 324 such as a hopper, a tank, a wire, or a powder bed. For example, aluminum powder may be swept from a powder bed over build platform 318 by a brush arm actuated by computer controller 312.

The raw material may be distributed evenly over build platform 318, or may be deposited in a selected pattern. Depositing may be done under control of computer controller 312. In some examples, build platform 318 may be submerged in raw material and depositing may be accomplished by gravity or fluid pressure. In some examples, a print head 326 connected to raw material source 324 may deposit the raw material in a pattern corresponding to the first layer of the ordered plurality of layers.

At step 206, the raw material is altered to produce the first layer. In other words, a physical change is induced the deposited material, according to the design information describing the first layer of the ordered plurality of layers and as directed by the computer controller 312, to realize the first layer as a physical object on build platform 318.

The material may be acted on by a print head 326 of printer 310, controlled by computer controller 312. For example, print head 326 may include a laser that cures a photopolymer by exposure to light or sinters a metal powder by exposure to heat. Print head 326 may be directed by computer controller 312 to follow a path defined in the received digital information for the first layer, and/or a path calculated by processor 314 based on the received digital information.

Step 208 includes repositioning build platform 318. In some examples, build platform 318 may initially be positioned at a selected distance from print head 326. The selected distance may be determined based on the procedures to be performed by print head 326. Subsequent to production of a layer, build platform 318 may be repositioned by computer controller 312 along manufacturing axis 322 away from print head 326 by an amount approximately equal to the layer's thickness. That is, build platform 318 may be moved such that a top surface of the produced layer is separated by the selected distance from print head 326.

In some examples, build platform 318 may start in alignment with another element of printer 310 such as a raw material distribution component. Subsequent to production of a layer, build platform 318 may be repositioned by computer controller 312 along manufacturing axis 322 such that a top surface of the produced layer is aligned with the other element of printer 310. In some examples, at step 208 print head 326 may be repositioned instead of or in addition to build platform 318. In some examples, step 208 may be skipped.

At step 210, raw material is deposited on the layer produced in the preceding step of method 200. As described for step 204, the raw material may be any appropriate material and may be deposited in any appropriate manner. At step 212, the raw material is altered to produce the next layer as previously described for step 206.

Steps 208 through 212 may be repeated to produce each layer of the plurality of layers of the received digital information, until the last layer is produced. The produced first through last layers may then comprise additively manufactured workpiece 328 as described in the received digital information. The additively manufactured workpiece may be removed from the printer and post-processed as desired. For example, the additively manufactured workpiece may be machined from a build plate of the build platform, and fine details and/or smooth surfaces may be further finished by machining and/or other methods.

D. Illustrative Method of Manufacturing a Matched Compression Mold Die

Figure 16:
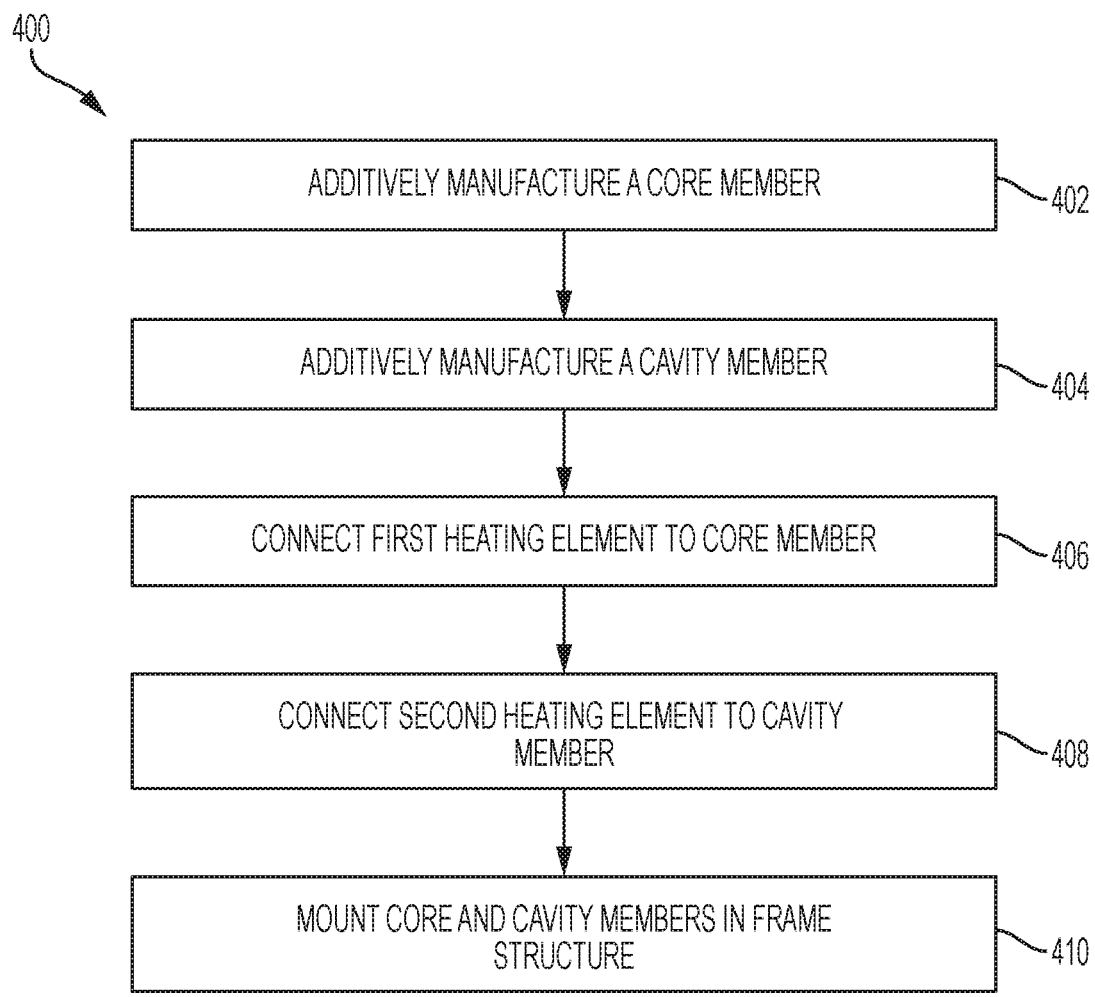
FIG. 16 is a flow diagram depicting steps in an illustrative method of manufacturing a matched compression mold die, in accordance with aspects of the present disclosure.

This section describes steps of an illustrative method 400 of manufacturing a matched compression mold die; see FIG. 16. Aspects of illustrative additive manufacturing device 310 and/or method 200 may be utilized in the method steps described below. Where appropriate, reference may be made to components and systems that may be used in carrying out each step. These references are for illustration, and are not intended to limit the possible ways of carrying out any particular step of the method.

FIG. 16 is a flowchart illustrating steps performed in an illustrative method 400, and may not recite the complete process or all steps of the method. Although various steps of method 400 are described below and depicted in FIG. 16, the steps need not necessarily all be performed, and in some cases may be performed simultaneously or in a different order than the order shown.

At step 402, method 400 includes additively manufacturing a core member. The core member may comprise, e.g., first middle section 61 of first illustrative die component 55.

At step 404, method 400 includes additively manufacturing a cavity member. The cavity member may comprise, e.g., second middle section 66 of second illustrative die component 56.

Additive manufacturing steps 402 and 404 may include aspects of additive manufacturing method 200. In some examples, the core member and the cavity member are made of metal. In some examples, the core and the cavity member are made of thermoplastic material, such as acrylic, nylon, polycarbonate, and/or the like. The core and cavity members may additionally or alternatively be made of thermoset materials and/or neat and/or reinforced polymer material. Any suitable additive manufacturing techniques may be used to carry out steps 402 and 404.

At step 406, method 400 includes connecting a first heating element to the core member. The first heating element may comprise first heat blanket 87 and/or any other suitable heat mechanism. Connecting the first heating element to the core member may include disposing the first heating element on a surface of the core member and/or within the core member. In some examples, connecting the first heating element to the core member includes bonding the heating element to a surface of the core member (e.g., first non-forming surface 93).

At step 408, method 400 includes connecting a second heating element to the cavity member. The second heating element may comprise second heat blanket 90 and/or any other suitable heat mechanism. Connecting the second heating element to the cavity member may include disposing the second heating element on a surface of the cavity member and/or within the cavity member. In some examples, connecting the second heating element to the cavity member includes bonding the heating element to a surface of the cavity member (e.g., second non-forming surface 96).

At step 410, method 400 includes mounting the core and cavity members in a frame structure configured for molding a workpiece (e.g., workpiece 70). The frame structure may comprise first and second frame structures 63 and 68, and/or any other structure suitable for supporting the core and cavity members such that they may be pressed together by a compression device. In some examples, the frame structure is a generic frame structure configured to support different core and cavity members. The different core and cavity members may be configured for manufacturing different workpieces, e.g., different shapes of aircraft panels. In these examples, step 410 includes interchanging different core and/or cavity members in the frame structure for manufacturing different panel configurations.

E. Illustrative Method of Manufacturing a Compression-Molded Part

Figure 17:
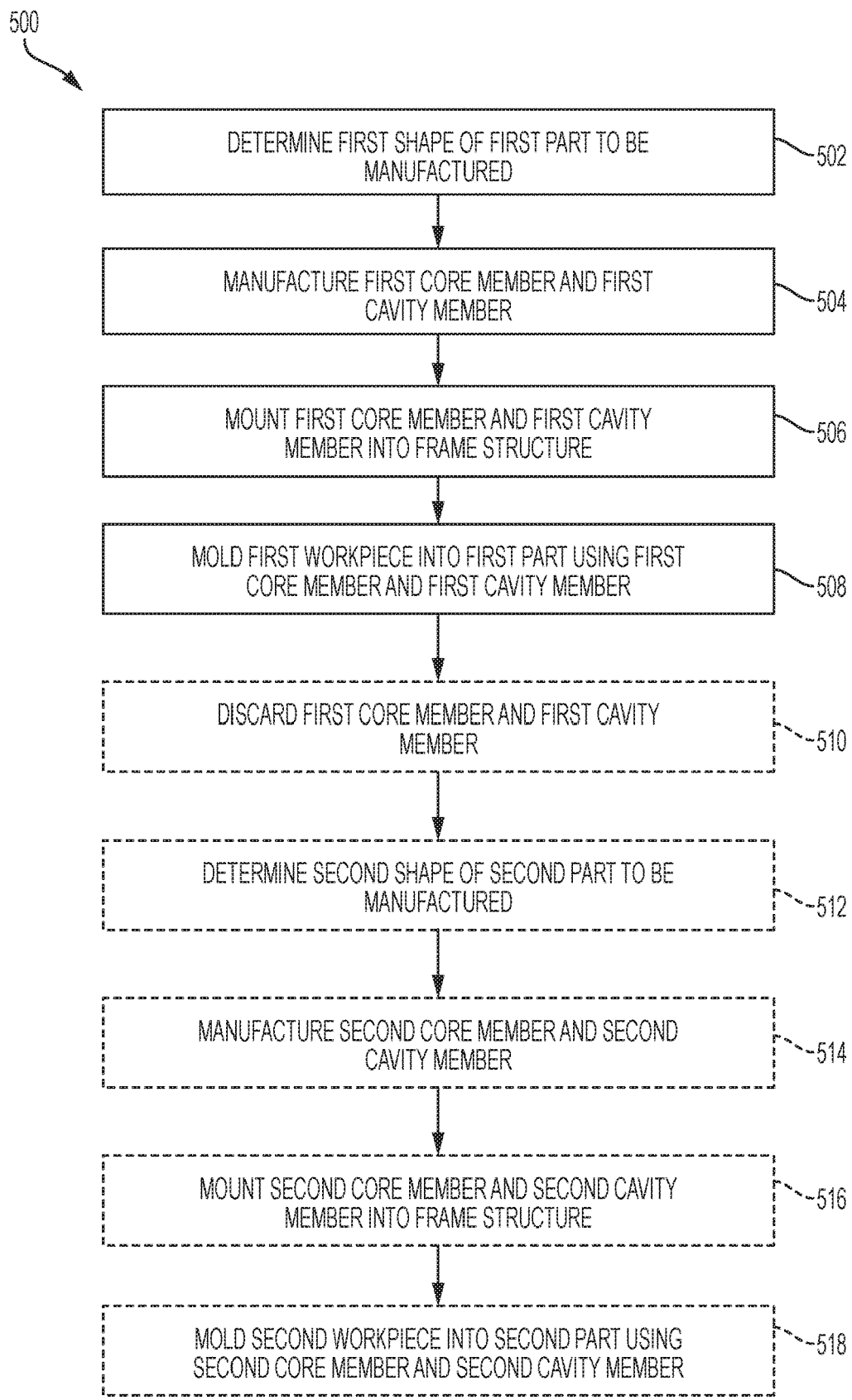
FIG. 17 is a flow diagram depicting steps in an illustrative method of manufacturing a compression-molded part, in accordance with aspects of the present disclosure.

This section describes steps of an illustrative method 500 of manufacturing a compression-molded part; see FIG. 17. Aspects of illustrative additive manufacturing device 310 may be utilized in the method steps described below. Where appropriate, reference may be made to components and systems that may be used in carrying out each step. These references are for illustration, and are not intended to limit the possible ways of carrying out any particular step of the method.

FIG. 17 is a flowchart illustrating steps performed in illustrative method 500, and may not recite the complete process or all steps of the method. Although various steps of method 500 are described below and depicted in FIG. 17, the steps need not necessarily all be performed, and in some cases may be performed simultaneously or in a different order than the order shown.

At step 502, method 500 includes determining a first shape of a first compression-molded part that is to be manufactured. For example, the first compression-molded part may be an aircraft interior panel (e.g., sandwich panel 25), and the first shape may be determined based on aircraft design information.

At step 504, method 500 includes manufacturing a first core member (e.g., a convex compression die middle section such as first middle section 61) and a first cavity member (e.g., a concave compression die middle section such as second middle section 66) configured to cooperatively compression-mold a first workpiece (e.g., workpiece 70) into the first shape determined at step 502. Typically, the first core member and/or the first cavity member are manufactured by additive manufacturing techniques.

At step 506, method 500 includes mounting the first core member and the first cavity member into a frame structure (e.g., a frame structure comprising first frame structure 63 and second frame structure 68). The frame structure supports the first core member and the first cavity member so that they may be used to mold the first workpiece. The frame structure is a generic structure configured to support different core members and cavity members.

At step 508, method 500 includes molding the first workpiece, using the first core member and the first cavity member, to create the first compression-molded part having the determined first shape. For example, a compression device such as press 100 may be used to press the first cavity member toward the first core member with the first workpiece between them, such that the first workpiece is molded into the first compression-molded part. Molding the first workpiece at step 508 typically includes using a heating mechanism to heat the first workpiece, thereby facilitating molding and/or curing of the first workpiece.

At step 510, method 500 optionally includes discarding the first core member and the first cavity member. Because replacements for the first core member and the first cavity member may be additively manufactured quickly at a relatively low cost, it may be more cost-effective to discard the first core member and first cavity member after use (and/or after a short period of disuse) than to store them until needed again. Discarding the first core member and first cavity member may include recycling the first core member and/or the first cavity member so that the material from which the core and/or cavity member was manufactured may be reused. For example, the first core member and the first cavity member may be melted, and at least a portion of the melted material may be reused as raw material for additively manufacturing another object. The melted material may be stored and/or processed (e.g., converted to a powder, fluid, wire, and/or any other suitable form) before being reused.

At step 512, method 500 optionally includes determining a second shape of a second compression-molded part to be manufactured. The second compression-molded part may be an aircraft interior panel (e.g., sandwich panel 25), and the second shape may be determined based on aircraft design information.

At step 514, method 500 optionally includes manufacturing a second core member (e.g., a convex compression die middle section such as first middle section 61) and a second cavity member (e.g., a concave compression die middle section such as second middle section 66) configured to cooperatively compression-mold a second workpiece (e.g., workpiece 70) into the second shape determined at step 512. Typically, the second core member and/or the second cavity member are additively manufactured. The second core member and/or the second cavity member may be partially or entirely manufactured from material obtained by recycling the first core member and/or the first cavity member.

In some examples, the second shape of the second compression-molded part is identical or nearly identical to the first shape of the first compression-molded part. Accordingly, the second core and cavity members may be identical or nearly identical to the first core and cavity members. For example, if the first core and cavity members were discarded at step 510, and it is later determined that a duplicate of the first compression-molded part is required, then the second core and cavity members may be additively manufactured when needed (e.g., on demand) to compression-mold a second part having the same shape as the first. The second workpiece may include the same material and/or same sandwich layers of material as the first workpiece.

At step 516, method 500 optionally includes mounting the second core member and second cavity member into the frame structure. Because the frame structure is a generic frame structure, it supports second core and cavity members that are different from the first core and cavity members as well as second core and cavity members that are substantially identical to the first members.

At step 518, the method optionally includes molding the second workpiece into the second compression-molded part using the second core member and the second cavity member. Step 518 typically includes using a compression device and a heating mechanism to compression-mold the second part. The compression device and/or heating mechanism used in step 518 may be the same compression device and/or heating mechanism used in step 508.

Method 500 may be an example of lean manufacturing. For example, manufacturing compression die components on demand (e.g., when and/or where the components are needed) may reduce and/or eliminate the need to store a large inventory of different die components. Because the die components may be manufactured with a relatively small lead time, the components may be made to order (e.g., the component may be made when a need for the component becomes apparent, rather than in anticipation of such a need). Accordingly, the risk of making an unneeded die component is reduced relative to conventional methods of manufacturing die components. Die components may also be manufactured at or near the location where they will be used. For example, the die components may be manufactured near a compression device that is difficult or impossible to move to another location. Accordingly, method 500 saves time and energy that would otherwise have been spent transporting the die components to the location where they are to be used. Recycling material from the first core and cavity members to at least partially create the second core and cavity members also reduces wasted material, in accordance with principles of lean manufacturing and environmental sustainability.

F. Illustrative Combinations and Additional Examples

This section describes additional aspects and features of a matched compression die apparatus having additively manufactured components, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A matched compression die apparatus, comprising an additively manufactured first die component having a first middle section configured to mold a contour on a first side of a workpiece, an additively manufactured second die component having a second middle section configured to mold a contour on a second side of the workpiece, a heating mechanism configured to heat the first and second middle sections sufficiently to cure the workpiece into a desired shape, and a compression device configured to apply a force directing the first and second middle sections toward each other.

A1. The apparatus of paragraph A0, wherein the first and second middle sections are comprised of a polymer material.

A1a. The apparatus of paragraph A1, wherein the polymer material includes a neat polymer material and/or a reinforced polymer material.

A1b. The apparatus of paragraph A1, wherein the polymer material includes a thermoplastic or thermoset material, neat and/or reinforced.

A2. The apparatus of paragraph A0, wherein the first and second middle sections are comprised of a metal material.

A3. The apparatus of any one of paragraphs A0 through A2, wherein the heating mechanism includes a first heat blanket connected to a bottom side of the first middle section, and a second heat blanket connected to a top side of the second middle section.

A4. The apparatus of any one of paragraphs A0 through A3, wherein each of the die components has a rigid frame structure configured to support interchangeable middle sections for molding workpieces of different shapes.

A5. The apparatus of any one of paragraphs A0 through A4, wherein the first and second middle sections are configured to mold an interior panel for an aircraft.

A6. The apparatus of any one of paragraphs A0 through A5, wherein the first and second middle sections are configured for crushed-core molding a honeycomb-core thermoset sandwich composite panel.

A6a. The apparatus of any one of paragraphs A0 through A5, wherein the first and second middle sections are configured for molding a thermoplastic wall panel.

A7. The apparatus of any one of paragraphs A0 through A6, wherein the first and second middle sections and corresponding heat blankets are configured to heat a workpiece up to a temperature between 200 to 300 degrees Fahrenheit.

A8. The apparatus of any one of paragraphs A0 through A7, wherein the compression device includes a press configured to apply a pressure of at least 50 pounds per square inch forcing the middle sections toward each other.

A9. The apparatus of any one of paragraphs A0 through A8, wherein the apparatus weighs less than 1000 pounds.

A10. The apparatus of any one of paragraphs A0 through A8, wherein the apparatus weighs less than 500 pounds.

B0. A matched compression die apparatus, comprising a core member, a cavity member, the core member and the cavity member being configured to cooperatively shape opposing sides of a panel, a first frame structure configured to support the core member, a second frame structure configured to support the cavity member, wherein the frame structures are generic, the core and cavity members being selectively mounted in the corresponding frame structures and configured for molding a specific panel shape.

B1. The apparatus of paragraph B0, wherein core and cavity members are made by additive manufacturing.

B2. The apparatus of any one of paragraphs B0 through B1, wherein the core and cavity members are made of a metal material.

B3. The apparatus of any one of paragraphs B0 through B1, wherein the core and cavity members are made of a polymer material.

B3a. The apparatus of paragraph B3, wherein the polymer material includes a neat polymer material and/or a reinforced polymer material.

B3b. The apparatus of paragraph B3, wherein the polymer material includes a thermoplastic or thermoset material, neat and/or reinforced.

B4. The apparatus of any one of paragraphs B0 through B3, further comprising a compression device configured to apply a force directing the core and cavity members toward each other.

B5. The apparatus of any one of paragraphs B0 through B4, further comprising a first heat blanket connected to a bottom side of the core member, and a second heat blanket connected to a top side of the cavity member.

C0. A method of manufacturing a matched compression mold die, comprising additively manufacturing a core member, additively manufacturing a cavity member, connecting a first heating element to the core member, connecting a second heating element to the cavity member, and mounting the core and cavity members in a frame structure configured for molding a workpiece.

C1. The method of paragraph C0, wherein the frame structure is generic, the mounting step including interchanging different core and cavity members in the frame structure for manufacturing different panel configurations.

C2. The method of any one of paragraphs C0 through C1, wherein the core and cavity members are made of a metal material.

C3. The method of any one of paragraphs C0 through C1, wherein the core and cavity members are made of a polymer material.

C3a. The method of paragraph C3, wherein the polymer material includes a neat polymer material and/or a reinforced polymer material.

C3b. The method of paragraph C3, wherein the polymer material includes a thermoplastic or thermoset material, neat and/or reinforced.

D0. A method of manufacturing a compression-molded part, comprising determining a first shape of a first compression-molded part to be manufactured; manufacturing a first core member and a first cavity member configured to cooperatively compression-mold a first workpiece into the determined first shape; mounting the first core member and the first cavity member into a frame structure; and molding the first workpiece, using the first core member and the first cavity member, to create the first compression-molded part having the determined first shape.

D1. The method of paragraph D0, wherein manufacturing the first core member and the first cavity member includes additively manufacturing the first core member and the first cavity member.

D2. The method of any one of paragraphs D0 through D1, further comprising, after the pressing step, discarding the first core member and the first cavity member.

D3. The method of any one of paragraphs D0 through D2, wherein the first compression-molded part is an interior panel for an aircraft.

D4. The method of any one of paragraphs D0 through D3, further comprising determining a second shape of a second compression-molded part to be manufactured; manufacturing a second core member and a second cavity member configured to cooperatively compression-mold a second workpiece into the determined second shape; mounting the second core member and the second cavity member into the frame structure; and molding the second workpiece, using the second core member and the second cavity member, to create the second compression-molded part having the determined second shape.

D5. The method of paragraph D4, wherein manufacturing the second core member and the second cavity member includes additively manufacturing the second core member and the second cavity member.

D6. The method of any one of paragraphs D4 through D5, wherein the second shape is identical to the first shape.

D7. The method of any one of paragraphs D4 through D6, wherein the second compression-molded part is an aircraft panel.

Advantages, Features, and Benefits

The different embodiments and examples of the matched compression die apparatus described herein provide several advantages over known solutions for compression-molding thermoset aircraft panels and/or other parts. For example, illustrative embodiments and examples described herein allow for compression die tool components to be produced at a relatively high speed and low cost compared to traditional production methods, especially in cases where the compression die tool components are configured to compression-mold parts having complex contours.

Additionally, and among other benefits, illustrative embodiments and examples described herein allow for manufacturing compression die components having interchangeable middle sections (e.g., interchangeable cavity and core members) supportable by generic frame sections. Accordingly, illustrative embodiments and examples described herein allow compression die tools configured to mold different parts to be manufactured relatively quickly and easily, and to be stored in a relatively small amount of space.

Additionally, and among other benefits, illustrative embodiments and examples described herein allow compression die components, or portions thereof, to be treated as disposable. Because additively manufactured die components, and/or middle sections of die components, are relatively fast and inexpensive to manufacture, it is in some cases feasible to manufacture the components (and/or component middle sections) on demand and dispose of them after use rather than store them.

Additionally, and among other benefits, illustrative embodiments and examples described herein allow for compression die components to be cost-effectively manufactured even in situations where the components are expected to be used to compression-mold a small number of parts. For example, compression die components may be manufactured that are configured to compression-mold a small number of replacement panels for aircraft models that are no longer being produced. In contrast, conventional compression die components are so expensive and time-consuming to manufacture that it is typically not feasible to manufacture components that will be used to mold only a small number of parts.

Additionally, and among other benefits, illustrative embodiments and examples described herein allow compression die tool components to be manufactured while wasting less material than is typically wasted in subtractive manufacturing techniques.

Additionally, and among other benefits, illustrative embodiments and examples described herein allow for manufacture of compression die tool components that are significantly lower in weight than traditional components. Accordingly, the compression die tool components of the present disclosure can be moved about a manufacturing environment for increased flexibility when manufacturing compression-molded parts.

For example, interchangeable middle sections of the compression die components can easily be moved from a storage space to a compression device, and then back into storage. The storage space could be a remote storage space far from the compression device. The compression die tool components described herein may also be used with a less powerful compression device than is required for traditional tool components, especially in cases where the compression device is configured to lift one or more tool components.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A matched compression die apparatus, comprising:
   an additively manufactured first die component having a first middle section configured to mold a contour on a first side of a workpiece,
   an additively manufactured second die component having a second middle section configured to mold a contour on a second side of the workpiece,
   a heating mechanism configured to heat the first and second middle sections sufficiently to cure the workpiece into a desired shape, and
   a compression device configured to apply a force directing the first and second middle sections toward each other,
   wherein the heating mechanism includes a first heat blanket contacting a non-forming surface opposite a first forming surface of the first middle section, and a second heat blanket contacting a non-forming surface opposite a second forming surface of the second middle section.

2. The apparatus of claim 1, wherein the first and second middle sections are comprised of a polymer material.

3. The apparatus of claim 1, wherein the first and second middle sections are comprised of a metal material.

4. The apparatus of claim 1, wherein each of the die components has a rigid open frame structure configured to support interchangeable middle sections for molding workpieces of different shapes.

5. The apparatus of claim 1, wherein the first and second middle sections are configured to mold an interior panel for an aircraft.

6. The apparatus of claim 1, wherein the first and second middle sections are configured for crushed-core molding a honeycomb-core thermoset sandwich composite panel.

7. The apparatus of claim 1, wherein the first and second middle sections and corresponding heat blankets are configured to heat a workpiece up to a temperature between 200 to 300 degrees Fahrenheit.

8. The apparatus of claim 1, wherein the compression device includes a press configured to apply a pressure of at least 50 pounds per square inch forcing the middle sections toward each other.

9. The apparatus of claim 1, wherein the apparatus weighs less than 1000 pounds.

10. A matched compression die apparatus, comprising:
    a core member,
    a cavity member, the core member and the cavity member being configured to cooperatively shape opposing sides of a panel,
    a first open frame structure configured to support the core member, including a peripheral frame portion defining a central opening providing access to a non-forming side of the core member,
    a second open frame structure configured to support the cavity member, including a peripheral frame portion defining a central opening providing access to a non-forming side of the cavity member, wherein the frame structures are generic, the core and cavity members being selectively attached to their corresponding frame structures and configured for molding a specific panel shape.

11. The apparatus of claim 10, wherein the core and cavity members are made by additive manufacturing.

12. The apparatus of claim 10, further comprising:
    a compression device configured to apply a force directing the core and cavity members toward each other.

13. The apparatus of claim 10, further comprising:
a first heat blanket connected to the non-forming side of the core member, and a second heat blanket connected to the non-forming side of the cavity member.

14. The apparatus of claim 1, wherein each of the first and second heat blankets includes a multi-zonal heat blanket system.

15. The apparatus of claim 1, wherein each of the first and second heat blankets is adhesively bonded to the respective non-forming surface.

16. The apparatus of claim 1, wherein each of the first and second heat blankets includes one or more smart susceptors configured to maintain a temperature within a predetermined range in the respective heat blanket.

17. The apparatus of claim 10, further comprising:
a first heat blanket on the non-forming side of the core member, and a second heat blanket on the non-forming side of the cavity member, wherein the central openings of the first and second open frame structures provide access to the respective heat blankets.

18. The apparatus of claim 10, wherein the core and cavity members are attached to their corresponding frame structures by a plurality of fasteners.

19. The apparatus of claim 18, wherein the plurality of fasteners is selected from a group consisting of bolts, pins, latches, clips, clamps, screws, and nails.

* * * * *